United States Patent [19]
Maturi et al.

[11] Patent Number: 5,905,768
[45] Date of Patent: *May 18, 1999

[54] MPEG AUDIO SYNCHRONIZATION SYSTEM USING SUBFRAME SKIP AND REPEAT

[75] Inventors: Greg Maturi, Tracy; Gregg Dierke, San Jose, both of Calif.

[73] Assignee: LSI Logic Corporation, Milpitas, Calif.

[*] Notice: This patent is subject to a terminal disclaimer.

[21] Appl. No.: 08/771,585

[22] Filed: Dec. 20, 1996

Related U.S. Application Data

[63] Continuation-in-part of application No. 08/358,021, Dec. 13, 1994, Pat. No. 5,694,332, and a continuation of application No. 08/375,951, Jan. 20, 1995, Pat. No. 5,588,029.

[51] Int. Cl.⁶ ........................................................ H04L 7/06
[52] U.S. Cl. .......................... 375/364; 375/368; 370/509
[58] Field of Search .................................... 375/362, 364, 375/365, 366, 368, 372; 370/506, 509; 348/500, 512, 513, 516, 518, 403, 423, 426

[56] References Cited

U.S. PATENT DOCUMENTS 3,867,579 2/1975 Colton et al. .
4,649,536 3/1987 Krinock .
4,660,079 4/1987 Devimeux et al. .
4,675,886 6/1987 Surie .
4,839,733 6/1989 Karamon et al. .
5,202,761 4/1993 Cooper .
5,294,983 3/1994 Ersoz et al. .
5,351,090 9/1994 Nakamura .
5,351,092 9/1994 Poimboeuf et al. .
5,420,801 5/1995 Dockter et al. .
5,430,485 7/1995 Lankford et al. .
5,537,409 7/1996 Moriyama et al. ...................... 370/509
5,577,044 11/1996 Oxford .................................... 370/522
5,694,332 12/1997 Maturi ...................................... 360/40

*Primary Examiner*—Don N. Vo

[57] ABSTRACT

A Motion Picture Experts Group (MPEG) video/audio data bitstream comprises frames of encoded audio data, each of which includes a plurality of integrally encoded subframes, which are decoded by an audio decoder for presentation. A synchronization unit controls the decoder to skip a subframe if a predetermined decoding time for the subframe is earlier than a current time, and to repeat the subframe if the predetermined decoding time is later than the current time. A typical MPEG audio frame includes 12 subframes, such that skipping or repeating a subframe is 1/12 as noticeable as skipping or repeating an entire frame. A buffer memory stores one or more subframes prior to decoding, such that the subframes can be skipped or repeated by manipulation of a read pointer for the memory.

22 Claims, 3 Drawing Sheets

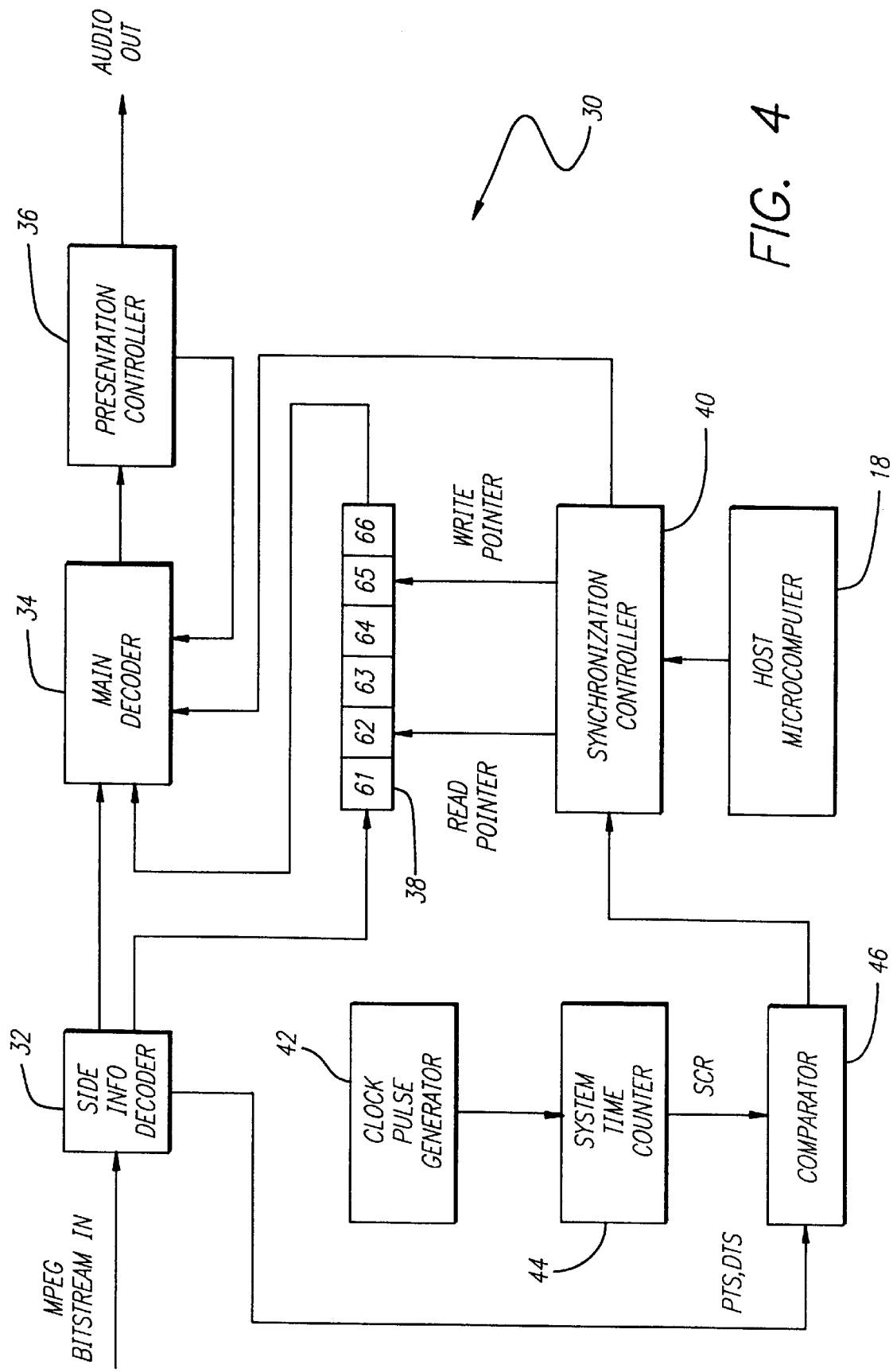

MPEG AUDIO SYNCHRONIZATION SYSTEM USING SUBFRAME SKIP AND REPEAT

CROSS REFERENCE TO RELATED APPLICATIONS

This application is a continuation-in-part of U.S. application Ser. No. 08/358,021, filed Dec. 13, 1994, entitled MPEG AUDIO DECODING SYSTEM WITH SUBFRAME INPUT BUFFERING, by Greg Maturi, now U.S. Pat. No. 5,694,332 and a continuation of U.S. application Ser. No. 08/375,951, filed Jan. 20, 1995, entitled MPEG AUDIO SYNCHRONIZATION SYSTEM USING SUBFRAME SKIP AND REPEAT, by Greg Maturi and Gregg Dierke, now U.S. Pat. No. 5,588,029.

BACKGROUND OF THE INVENTION

1. Field of the Invention

The present invention generally relates to the art of audio/video data compression and transmission, and more specifically to a synchronization system for a Motion Picture Experts Group (MPEG) audio/video decoder using audio subframe skip and repeat.

2. Description of the Related Art

Constant efforts are being made to make more effective use of the limited number of transmission channels currently available for delivering video and audio information and programming to an end user such as a home viewer of cable television. Various methodologies have thus been developed to achieve the effect of an increase in the number of transmission channels that can be broadcast within the frequency bandwidth that is currently allocated to a single video transmission channel. An increase in the number of available transmission channels provides cost reduction and increased broadcast capacity.

The number of separate channels that can be broadcast within the currently available transmission bandwidth can be increased by employing a process for compressing and decompressing video signals. Video and audio program signals are converted to a digital format, compressed, encoded and multiplexed in accordance with an established compression algorithm or methodology.

The compressed digital system signal, or bitstream, which includes a video portion, an audio portion, and other informational portions, is then transmitted to a receiver. Transmission may be over existing television channels, cable television channels, satellite communication channels, and the like.

A decoder is provided at the receiver to de-multiplex, decompress and decode the received system signal in accordance with the compression algorithm. The decoded video and audio information is then output to a display device such as a television monitor for presentation to the user.

Video and audio compression and encoding is performed by suitable encoders which implement a selected data compression algorithm that conforms to a recognized standard or specification agreed to among the senders and receivers of digital video signals. Highly efficient compression standards have been developed by the Moving Pictures Experts Group (MPEG), including MPEG 1 and MPEG 2. The MPEG standards enable several VCR-like viewing options such as Normal Forward, Play, Slow Forward, Fast Forward, Fast Reverse, and Freeze.

The MPEG standards outline a proposed synchronization scheme based on an idealized decoder known as a Standard Target Decoder (STD). Video and audio data units or frames are referred to as Access Units (AU) in encoded form, and as Presentation Units (PU) in unencoded or decoded form. In the idealized decoder, video and audio data presentation units are taken from elementary stream buffers and instantly presented at the appropriate presentation time to the user. A Presentation Time Stamp (PTS) indicating the proper presentation time of a presentation unit is transmitted in an MPEG packet header as part of the system syntax.

The presentation time stamps and the access units are not necessarily transmitted together since they are carried by different layers of the hierarchy. It is therefore necessary for the decoder to associate the presentation time stamp found at the packet layer with the beginning of the first access unit which follows it.

The situation is further complicated by the fact that in a real decoder the system has little control over the presentation times of the presentation units. For example, in the video decoder, video frames (pictures) must be presented at an exact multiple of the frame rate for the video to appear smooth, and the audio frames must be presented at exact multiples of the audio frame rate for the audio to be free of clicks.

In the idealized MPEG synchronization scheme, a system time clock (STC) which maintains a system clock time is provided in the decoder. The initial value of the system clock time is transmitted in the system stream by the encoder as a System Clock Reference (SCR) in an MPEG 1 bitstream, or as a Program Clock Reference (PCR) in an MPEG 2 bitstream. The decoder sets its local system time clock to the initial value, and then continues to increment it at a clock rate of 90 kHz.

Subsequently, the encoder transmits a presentation time stamp for an audio or video access unit, followed some time later by the access unit itself. The decoder compares the presentation time stamp to the local system clock time, and when they are equal removes the access unit from the elementary stream buffer, instantly decodes it to produce the corresponding presentation unit, and presents the presentation unit.

In a real system, synchronization is complicated by factors including the following.

1. Presentation units cannot be removed from the elementary stream buffer instantaneously, nor decoded or presented instantaneously.

2. Acceptable presentation unit boundaries may not be under the control of the encoder. For example if an MPEG decoder is locked to an external television synchronization signal, the presentation unit boundaries are controlled by the synchronization pulse generator, not the decoder itself. This creates error in the presentation time.

3. Presentation time stamps which have errors in them, due to channel errors, and may prevent a frame from being decoded indefinitely.

Any of these factors can produce a situation in which the decoder becomes out of synchronization with the intended decoding times of the presentation units, such that video and audio are decoded and presented too early or too late. This is especially undesirable in an application such as television in which the audio must be precisely synchronized with the video.

A prior art technique to re-synchronized the decoding and presentation of video and audio presentation units is to skip a presentation unit (frame) if the decoder is running behind, and to repeat a frame if the decoder is running ahead.

However, this technique can create significantly noticeable distortion in the form of discontinuities in video and audio presentation. In the audio data bitstream, an exemplary MPEG Layer II frame consists of 1,152 audio samples, and can include as much as 14,000 bits of data. Repeating or skipping an entire frame of audio data creates a discontinuity of approximately 0.07 seconds, which is very audible.

In addition, a buffer memory which is required to store several frames of data to be skipped or repeated must be relatively large, adding to the size, complexity and cost of the decoder.

For these reasons, there exists a need in the art for a method of synchronizing an MPEG audio decoder which does not introduce audible distortion into the presentation, and which does not require a large buffer memory.

SUMMARY OF THE INVENTION

A Motion Picture Experts Group (MPEG) video/audio data bitstream comprises frames of encoded audio data, each of which includes a plurality of integrally encoded subframes, which are decoded by an audio decoder for presentation.

A synchronization unit controls the decoder to skip a subframe if a predetermined decoding time for the subframe is earlier than a current time, and to repeat the subframe if the predetermined decoding time is later than the current time.

A typical MPEG audio frame includes 12 subframes, such that skipping or repeating a subframe is 1/12 as noticeable as skipping or repeating an entire frame. A buffer memory stores one or more subframes prior to decoding, such that the subframes can be skipped or repeated by manipulation of a read pointer for the memory.

The present system fills the need that has existed in the art by providing an MPEG audio decoder which can achieve re-synchronization without introducing audible distortion into the presentation, and which does not require a large buffer memory.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 4 is a block diagram illustrating the present audio decoding system.

DETAILED DESCRIPTION OF THE INVENTION

Figure 1:
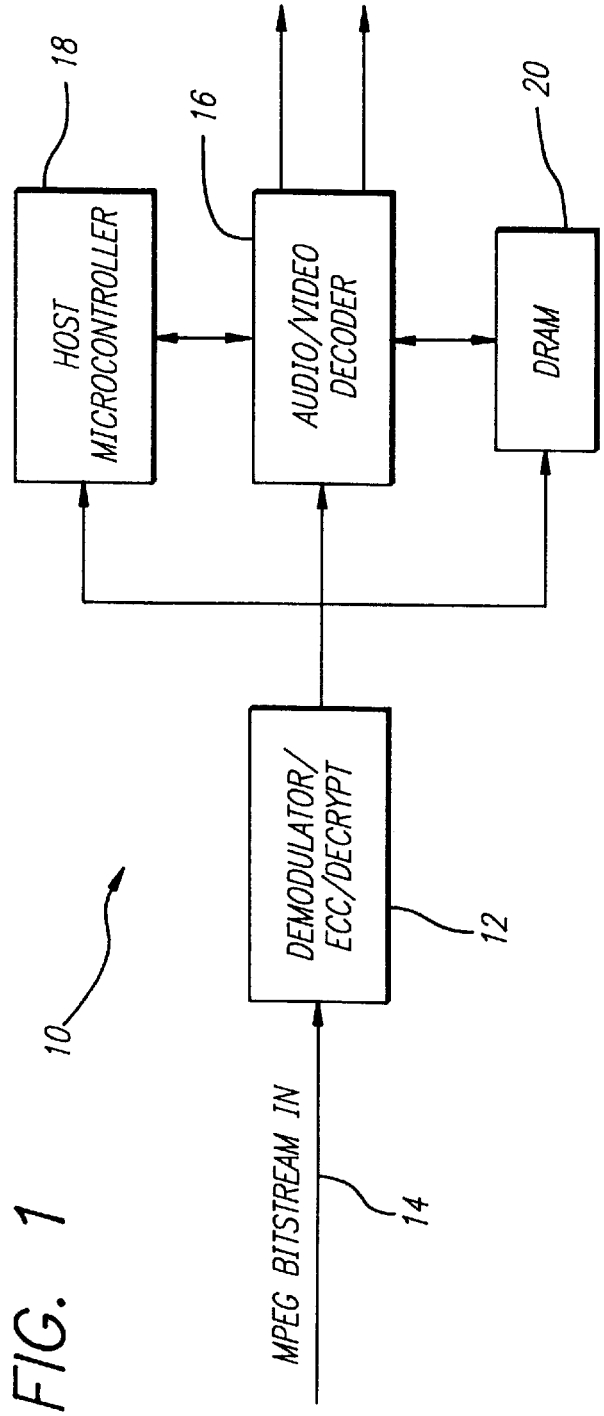
FIG. 1 is a block diagram illustrating a video/audio decoder comprising an audio decoding system according to the present invention.

A video/audio decoder system 10 embodying the present invention is illustrated in FIG. 1, and is intended to be offered as a commercial product of the LSI Logic Corporation of Milpitas, Calif., designated as the L64002 MPEG2 Audio/Video Decoder. The decoder 10 comprises a demodulator/ECC/decryption unit 12 for receiving an MPEG multiplexed bitstream from an encoder (not shown) via a communications channel 14. The unit 12 demodulates the input bitstream, performs error correction (ECC) and de-encrypts the demodulated data if it is encrypted for access limitation or data compression purposes.

The unit 12 applies the demodulated MPEG bitstream as digital data to a video/audio decoder 16, which de-multiplexes and decodes the bitstream to produce output video and audio signals in either digital or analog form.

The system 10 further comprises a host microcontroller 18 that interacts with the decoder 16 via an arrangement of interrupts as will be described in detail below. The decoder 16 and the microcontroller 18 have access to an external data storage such as a Dynamic Random Access Memory (DRAM) 20. It will be noted that the scope of the invention is not so limited, however, and that the memory 20 can be provided inside the decoder 16 or the microcontroller 18.

Figure 2:
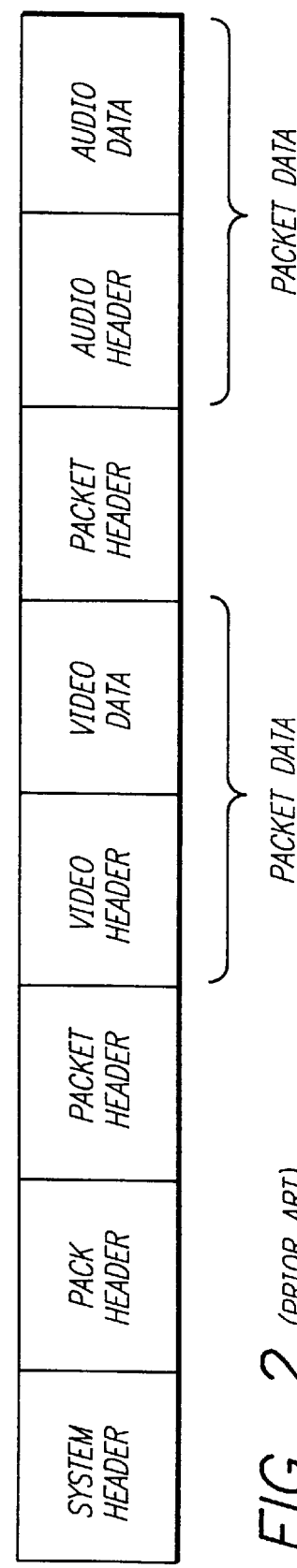
FIG. 2 is a simplified diagram illustrating a Motion Picture Experts Group (MPEG) data bitstream that is decoded by the decoder of FIG. 1.

A simplified, generic representation of an MPEG bitstream is illustrated in FIG. 2. The bitstream includes a system header that provides housekeeping and other information required for proper operation of the decoder 16. A pack header identifies a pack of data that comprises one or more packs, with each pack having a pack header. Each pack includes one or more video and/or audio access units (encoded frames), each of which is preceded by its own header having a frame Start Code (SC).

The MPEG system syntax governs the transfer of data from the encoder to the decoder. A system stream typically comprises a number of Packetized Elementary Streams (PES), which can be video or audio streams, that are combined together to form a program stream. A program is defined as a set of elementary streams which share the same system clock reference, so can be decoded synchronously to each other.

In MPEG 1 there are only two levels of hierarchy in the system syntax; the elementary stream and the program stream. In MPEG 2 there are more levels.

Figure 3:
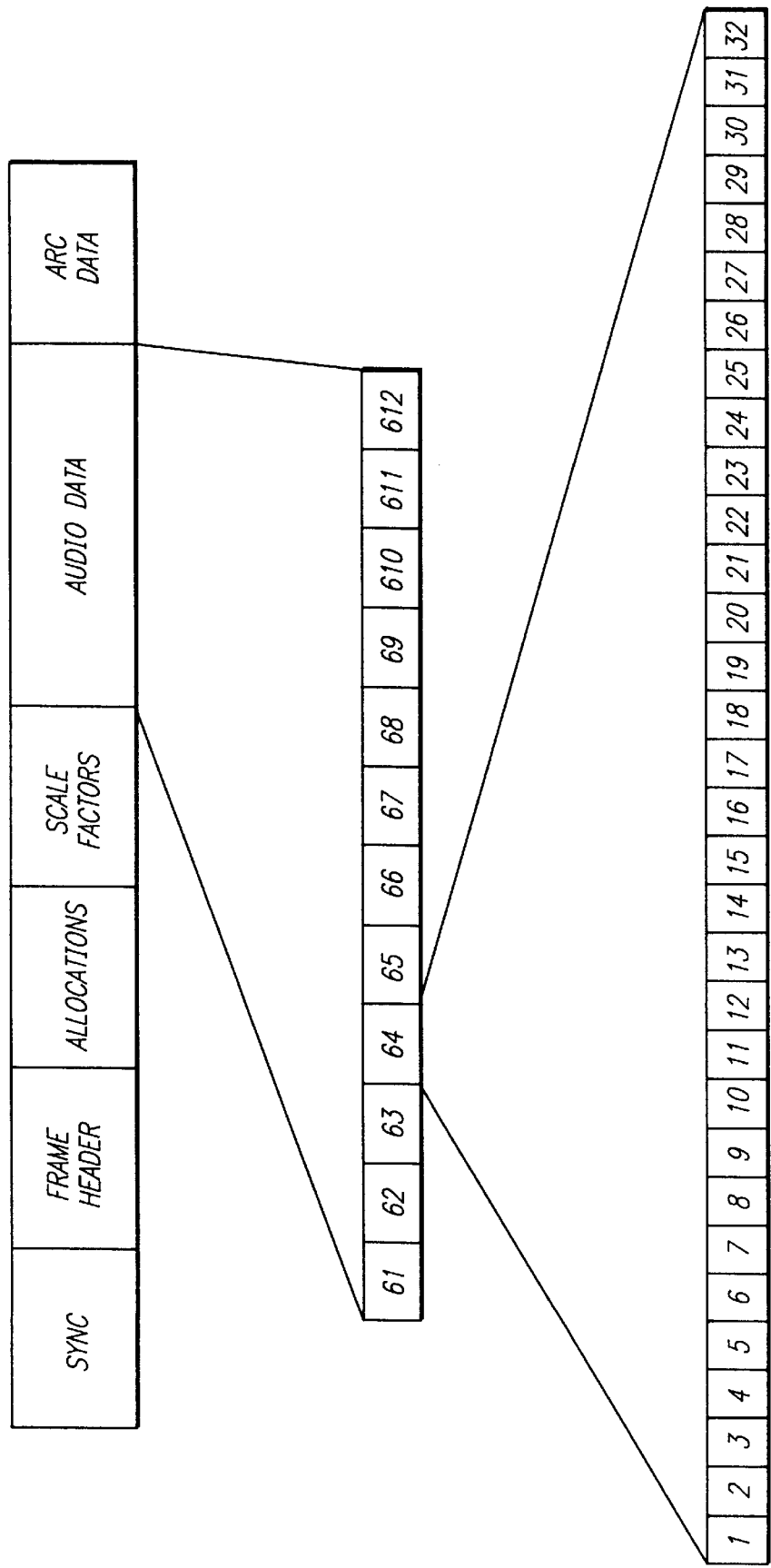
FIG. 3 is a diagram illustrating a frame of audio data of the bitstream of FIG. 2.

An audio presentation unit or frame is illustrated in FIG. 3, and comprises a synchronization code (typically "FFF" in the hexadecimal notation system), followed by a frame header that specifies "side" information including the bitrate, sampling rate and the MPEG layer (I, II or III) that was used for encoding. This is followed by an allocation parameter, which specifies the number of bits used to code samples, and a scale factor which indicates a factor by which decoded audio samples are to be multiplied.

The actual data is encoded in the form of subframes or groups that follow the scale factor designation, with ancillary data optionally following the data subframes.

The present invention will be described with reference to the Layer I encoding protocol of the MPEG specification. However, the invention is not limited, and can be applied to Layer II and III protocols, as well as to encoding scheme other than MPEG.

According to the Layer I encoding scheme, each audio frame comprises 12 subframes that are identified as G1 to G12 in FIG. 3. Each subframes G1 to G12 includes 32 subband samples of audio data that are designated by the numerals 1 to 32 respectively in FIG. 3, such that each frame includes 12×32=384 subband samples.

The method of encoding the subband samples is not the particular subject matter of the present invention and will not be described in detail. In general, 32 audio data samples are taken in the time domain, and converted into 32 subband samples in the frequency domain using matrixing operations in accordance with the Discrete Cosine Transform algorithm.

A separate scale factor is specified for each group or subframe of 32 subband samples. Due to the integrally encoded nature of each group of 32 subband samples, the subframe is the smallest unit of audio data that can be decoded independently.

An audio decoding system 30 which is part of the audio/video decoder 16 is illustrated in FIG. 4. The present system 30 includes a side information decoder 32 which parses and decodes the side information in each audio frame as illustrated in FIG. 3 to obtain the bitrate, sampling rate and other information for the frames.

The decoder 32 passes the side information directly to a main decoder 34 which decodes the subframes of audio data (access units AU) to produce decoded presentation units (PU) that are applied to a presentation controller 36 for presentation or playing.

The audio subframes are parsed and applied from the decoder 32 to a subframe buffer memory 38 which has the capacity to store one or more audio subframes. Although the memory 38 is illustrated as having a capacity of storing six subframes G1 to G6, the invention is not limited to any specific number.

The memory 39 is preferably a circular First-In-First-Out (FIFO) unit, having a write pointer and a read pointer that are controlled by a synchronization controller 40. The subframes are generally stored asynchronously in the memory 38 as received, with the write pointer being automatically incremented. Subframes are read out of the memory 38 and applied to the decoder 34 for decoding and presentation from the location of the read pointer, which is controlled in accordance with the synchronization of the decoding operation.

As illustrated in FIG. 4, the system 30 further comprises a System Time Clock (STC) counter 44 that is incremented by a 90 kHz clock pulse generator 42. The instantaneous count of the counter 44 constitutes a system clock time SCR0 which provides a time reference for synchronizing the decoding and presentation operations of the system 30. The system clock time SCR0 is applied to a comparator 46 as an input.

The decoder 32 further parses the input bitstream and captures any SCR (MPEG 1) or PCR (MPEG 2) time stamps that are included in any of the layers of the stream. These time stamps are system clock references that specify the correct value of the system clock time SCR0 at the time of decoding the SCR or PCR, and are used to synchronize the counter 44 in a manner which is not the particular subject matter of the invention.

The MPEG bitstream further includes Presentation Time Stamps (PTSs) and/or Decoding Time Stamps (DTSs) that indicate the required decoding and presentation times respectively of the subframes. Since the time between decoding and presentation is fixed and known, the decoding times can be determined from the PTSs, and vice-versa.

The decoder 32 parses the PTSs or DTSs and applies them to the comparator 46. Although not explicitly illustrated or described, the comparator 46 comprises a timing function that compensates for the decoding times of the PTSs or DTSs relative to storing the subframes in the memory 38, such that an accurate comparison of the PTSs or DTSs can be made with the system clock time SCR0.

The required decoding times for the subframes are specified by the PTSs or DTSs. The comparator 46 compares these values with SCR0 to determine if the subframes are being read out of the memory 38 and applied to the decoder 34 for decoding at the required times.

In accordance with this comparison, the synchronization controller 40 controls the memory 38 and the decoder 34 in one of three ways based on the error between the actual decoding time (the current system clock time SCR) and the required decoding time for a current subframe.

1. If the error is less than one subframe decoding time period, the audio frame is synchronized to the system time clock, and is decoded as scheduled.

2. If the actual decoding time is earlier than the required decoding time by more than one subframe decoding time period, the decoder 34 repeats a subframe.

3. If the actual decoding time is later than the required decoding time by more than one subframe decoding time period, the decoder 34 skips a subframe.

In this manner, the decoder 34 can operate at a decoding rate of 12/12 (normal), 11/12 (slow) or 13/12 (fast) in order to bring the decoding operation back into synchronization. Since the present system 30 skips or repeats only a subframe rather than an entire frame as in the prior art, the re-synchronization operation can be performed without any noticeable effect on the audio presentation.

A subframe is skipped by incrementing the read pointer twice, rather than once, such that the subframe that was initially pointed to is not read from the memory 38 to the decoder 34, but the following subframe is read out for decoding at the scheduled decoding time for the initial subframe.

A subframe can be repeated by not incrementing the read pointer, such that the subframe that is pointed to is read out and decoded twice. A subframe can also be repeated by causing the decoder to pause, such that the repeated subframes is decoded only once, but appears at the output of the decoder for two subframe decoding periods.

In summary, the present invention fills the need that has existed in the art by provided an MPEG audio decoder which can perform re-synchronization without introducing audible distortion into the presentation, and which does not require a large buffer memory.

Various modifications will become possible for those skilled in the art after receiving the teachings of the present disclosure without departing from the scope thereof.

We claim:

1. A system for decoding a data stream having frames of encoded data, each frame comprising a plurality of subframes, comprising:

a decoder for decoding said subframes; and a controller for controlling the decoder to perform a predetermined function based on a predetermined coding time for a subframe and a current time; said predetermined function comprises (1) skipping said subframe if the predetermined decoding time for said subframe is earlier than a current time, and (2) repeating said subframe if the predetermined decoding time is later than the current time.

2. A system as in claim 1, wherein said subframes comprise integrally encoded data.

3. A system as in claim 1, wherein the controller controls the decoder to repeat said subframe by causing the decoder to pause for a length of time required to decode said subframe.

4. A system as in claim 1, wherein the controller controls the decoder to skip said subframe by preventing said subframe from being input to the decoder, and causes a subframe following said subframe to be input to the decoder at substantially said predetermined decoding time.

5. A system as in claim 1, further comprising memory for storing said subframes prior to decoding thereof by the decoder.

6. A system as in claim 5, wherein the decoder repeats said subframe by reading and decoding said subframe from the memory twice.

7. A system as in claim 5, wherein the decoder skips said subframe by preventing the decoder from reading said subframe from the memory and reads a subframe following said subframe from the memory at substantially said predetermined decoding time.

8. A system as in claim 5, wherein:

the memory comprises a read pointer; and the decoder repeats said subframe by inhibiting incrementation of said read pointer.

9. A system as in claim 5, wherein:

the memory comprises a read pointer; and the decoder skips said subframe by incrementing said read pointer twice.

10. A system as in claim 5, wherein said memory has capacity to store one of said subframes.

11. A system as in claim 1, wherein:

said data stream further includes a time stamp for indicating said predetermined decoding time;

the controller comprises a comparator for comparing said time stamp with said current time.

12. A method for decoding a data stream having frames of encoded data, each frame including a plurality of subframes, comprising the steps of:

(a) determining a decoding time for a subframe;

(b) sensing a current time; and (c) operating on said subframe according to a predetermined criteria based on said decoding time and said current time; said predetermined criteria comprising (1) skipping said subframe if said decoding time is earlier than said current time, and (2) repeating said subframe if said decoding time is later than said current time.

13. A method as in claim 12, wherein said data stream comprises frames of encoded data and said subframes comprise integrally encoded data.

14. A method as in claim 12, wherein step (c2) comprises pausing for a length of time required to decode said subframe.

15. A method as in claim 12, wherein step (c1) comprises preventing said subframe from being transmitted, and causing a subframe following said subframe to be transmitted at substantially said decoding time.

16. A method as in claim 12, further comprising the step, performed prior to step (a), of:

providing a memory having capacity for storing at least one of said subframes.

17. A method as in claim 12, wherein:

said data stream further includes a time stamp for indicating said decoding time;

step (c) further comprises comparing said time stamp with said current time.

18. A method as in claim 12, further comprising the step, performed prior to step (c), of:

(f) storing said subframes in a memory.

19. A method as in claim 18, wherein step (c2) comprises causing the decoder to read and decode said subframe from the memory twice.

20. A method as in claim 18, wherein step (c1) comprises:

preventing a decoder from reading said subframe from the memory; and causing the decoder to read a subframe following said subframe from the memory at substantially said decoding time.

21. A method as in claim 18, wherein:

the memory comprises a read pointer; and step (c2) comprises inhibiting incrementation of said read pointer.

22. A method as in claim 18, wherein:

the memory comprises a read pointer; and step (c1) comprises incrementing said read pointer twice.

* * * * *

UNITED STATES PATENT AND TRADEMARK OFFICE
CERTIFICATE OF CORRECTION

PATENT NO.        : 5,905,768
APPLICATION NO.   : 08/771585
DATED             : May 18, 1999
INVENTOR(S)       : Maturi et al.

It is certified that error appears in the above-identified patent and that said Letters Patent is hereby corrected as shown below:

Col. 6, line 50: after "predetermined", delete "coding" and insert --decoding--

Signed and Sealed this

Twenty-second Day of December, 2009

David J. Kappos
*Director of the United States Patent and Trademark Office*